Dec. 9, 1969

M. L. EMBREE ET AL  3,483,464

VOLTAGE REGULATOR SYSTEMS EMPLOYING A MULTIFUNCTIONAL CIRCUIT
COMPRISING A FIELD EFFECT TRANSISTOR CONSTANT CURRENT SOURCE

Filed Aug. 10, 1967

INVENTORS
M. L. EMBREE
B. H. HAMILTON
G. G. METZLER

BY
ATTORNEY

United States Patent Office 3,483,464
Patented Dec. 9, 1969

3,483,464
VOLTAGE REGULATOR SYSTEMS EMPLOYING A MULTIFUNCTIONAL CIRCUIT COMPRISING A FIELD EFFECT TRANSISTOR CONSTANT CURRENT SOURCE
Milton L. Embree, Laureldale, Pa, Billy H. Hamilton, Summit, N.J., and Clair G. Metzler, Ephrata, Pa., assignors to Bell Telephone Laboratories, Incorporated, Murray Hill and Berkeley Heights, N.J., a corporation of New York
Filed Aug. 10, 1967, Ser. No. 659,785
Int. Cl. G05f 1/40, 1/52
U.S. Cl. 323—22         17 Claims

ABSTRACT OF THE DISCLOSURE

A circuit for use in voltage regulators includes a current amplifier which is driven by a comparator amplifier. The output voltage is coupled through a voltage divider to the input of the comparator which compares it to a reference voltage. Any difference between the input and reference voltages causes the current amplifier to be driven so as to reduce that difference to zero. The circuit further includes a phase compensation network connected to the current amplifier in order to provide high frequency stability, a field-effect transistor constant current source connected to the output of the comparator in order to preregulate the input, and a clamp transistor connected to the input of the current amplifier in order to control the ON-OFF state of the voltage regulator.

BACKGROUND OF THE INVENTION

This invention relates to voltage regulator circuits and more particularly to a multifunctional circuit for use in various types of voltage regulators including positive and negative voltage regulators, high and low current regulators, and switching mode regulators.

In general, a series type voltage regulator compares the regulated output voltage with a reference voltage standard, derives a voltage which is representative of the difference between the two and uses this difference voltage to control the impedance of a transistor connected in series between the unregulated supply and the load. A negative feedback arrangement is used so that an increase in the difference voltage causes an increase in the impedance of the series transistor which increases the voltage drop across the transistor, thereby causing the output voltage to drop to normal. Changes in the difference voltage may typically be due to variations in the load current, the input voltage, or the temperature of semiconductor components.

The ability of a voltage regulator to maintain the output voltage at a predetermined level is termed its regulation which can be measured in percent as the ratio of the maximum deviation in the output level from the predetermined level to the predetermined level itself.

It is an object of this invention to regulate load voltage within a small percent regulation.

Voltage regulators often employ Zener diodes to establish the aforementionel reference voltage. In order that the reference voltage be constant, it is desirable that regulators be operative with the smallest possible variable current passing through the reference element. A regulator which is responsive to small current signals is particularly desirable since high current levels may cause internal temperature rise in transistors and diodes thereby changing their operating characteristics.

It is another object of the invention to control an output voltage in response to relatively small voltage and current signals indicative of deviations from a predetermined output voltage.

It is a further object of the invention to stabilize a transistorized voltage regulator against variations in temperature.

A comparison transistor is typically utilized to sample the output voltage, compare that voltage with the reference voltage, amplify the difference between the two voltages, and drive the series control transistor with that difference voltage so as to reduce the difference to zero. The output of the comparator and the input of the control transistor are generally connected to a common node which is in turn resistively coupled to the unregulated supply. Under these circumstances current variations from the supply will be injected into the control transistor thereby deteriorating regulation. A preregulator, which is in effect a constant current source, is connected between the node and supply to reduce the current variations so injected.

It is therefore another object of this invention to preregulate the unregulated supply so as to reduce the current variations injected into the control transistor and thereby to improve regulation.

Transistorized preregulators priorly used are inefficient in that they require relatively large bias voltages and consequently consume excessive power.

It is an object of this invention to preregulate more efficiently than has heretofore been possible.

It is frequently desirable to switch off power to the load by means of some external control signal, or perhaps by sensing an overload condition. Various transistor configurations coupled to the input of the control transistor respond to an appropriate signal to turn off the regulator. Generally, these circuits suffer from excessive internal current drain through the switching elements. Where the unregulated supply constitutes batteries, this current drain wastes power and runs down the batteries.

Another object of this invention is to be able to switch power off to the load without excessive internal current drain.

In order to achieve a high degree of D-C stability in the voltage regulator, it is desirable that the amplifier have a relatively high gain. When a large amount of gain is provided, however, the tendency of the closed loop feedback circuit (formed by the control transistor and comparator) to oscillate is greatly increased. This tendency to oscillate is indicative of poor A-C stability and is particularly troublesome where, from time to time, the current drawn by the load undergoes sharp transient variations. Such transients contain high frequency components which initiate either a transient of a sustained self-oscillation of the voltage regulator feedback circuit. It is customary in the art to connect relatively large capacitors between the comparator input and ground and between the output and ground to reduce the tendency to oscillate. Large capacitors, however, are not amenable to integrated circuit fabrication, especially circuits of the monolithic type.

It is an object of this invention, therefore, to reduce the tendency of voltage regulators to oscillate.

It is an associated object to be able to fabricate such a voltage regulator in integrated circuit form.

SUMMARY OF THE INVENTION

In accordance with an illustrative embodiment of the invention, a multifunctional circuit for use in voltage regulators comprises a current amplifier which is driven by a grounded emitter comparator amplifier. The output voltage is coupled through a voltage divider to the base input of the comparator amplifier which compares it to a reference voltage established by a voltage regulator diode connected in its emitter circuit. Any difference between the input and reference voltages causes the current amplifier to be driven so as to reduce that difference to zero.

A field-effect transistor constant current source connected between the unregulated input and the output of the comparator amplifier (which is also connected to the input of the current amplifier) operates as a preregulator. The FET effectively prevents line variations in the unregulated supply voltage from injecting substantial current variations into the input of the current amplifier and, in addition, serves as a high impedance load to the comparator. The FET preregulator reduces these current variations to a greater degree than prior art devices, provides a higher impedance load to the comparator than heretofore was possible and, furthermore, is more efficient since it requires a smaller bias voltage than prior preregulators. The smaller bias voltage required in turn implies that difference between the unregulated input and the regulated output may be correspondingly smaller. That is, the regulator is capable of regulating the output voltage to within a few volts of the input voltage.

The collector of a clamp transistor is connected to the input of the current amplifier in order to switch ON and OFF the regulator. The clamp transistor is driven into saturation in response to an appropriate signal in order to reduce the input to the current amplifier to ground potential. When the regulator is thus switched OFF, the load is effectively disconnected from the supply, i.e., little current reaches the load. In addition, the internal current drain through the highly nonlinear FET and the saturated clamp transistor is greatly reduced.

A phase compensation network to improve A-C stability is included in the control stage of one embodiment. The network comprises a pair of resistors connected in series between the output of the current amplifier and the internal node thereof. The junction point of the two resistors is then coupled through a voltage divider to the comparator input. The two resistors comprise a lead-lag network which prevents load capacitance from introducing too much phase lag into the feedback loop and thereby causing oscillation. The network accomplishes this end by introducing phase lead sufficient to maintain the loop phase shift to significantly less than 180° up to and beyond the unity gain frequency thus providing a phase margin that insures stability.

The phase compensation network utilizes no reactive components and is therefore readily fabricated in integrated circuit form.

The aforementioned multifunctional circuit, including the current and comparator amplifiers, FET preregulator and clamp transistor is readily connected to operate as a low power voltage regulator by merely connecting the collecor of the current amplifier to the unregulated supply and its emitter to the load.

The multifunctional circuit, when connected to appropriate external components, operates as a negative voltage regulator, a high power regulator, or a switching mode regulator.

BRIEF DESCRIPTION OF THE DRAWING

The above and other objects of the invention, together with its various features and advantages, can be easily understood from the following more detailed discussion, taken in conjunction with the accompanying drawing, in which.

DETAILED DESCRIPTION—MULTIFUNCTIONAL CIRCUIT

Figures 1A, 1B:
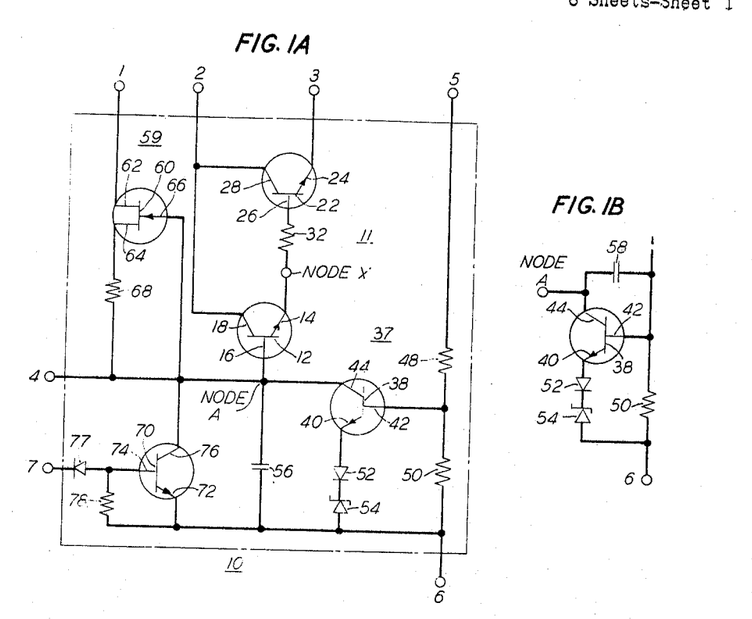
FIG. 1A is a schematic of the multifunctional circuit in accordance with the invention.
FIG. 1B is a partial schematic of the multifunctional circuit of FIG. 1A showing a modification thereof.

Turning now to FIG. 1A there is shown a multifunctional circuit 10 for use in voltage regulators. Depending upon the manner in which the terminals of the multifunctional circuit are interconnected to each other and to external components, the circuit may form the basic building block of a low or high power regulator, a positive or a negative regulator, or a switching mode regulator.

In particular, the multifunctional circuit 10 comprises a current amplifier 11 which is driven by a comparator amplifier 37. An FET constant current source 59 forms a part of the load of the comparator amplifier 37, and a clamp transistor 70 controls the ON-OFF state of the circuit 10.

The current amplifier 11 comprises a transistor 12 having emitter, base and collector regions 14, 16 and 18, respectively, and a transistor 22 having emitter, base and collector regions 24, 26 and 28, respectively. The collector regions 18 and 28 are connected together (and to external terminal 2) to form the collector region of the overall current amplifier 11. The emitter region 14 of transistor 12 is connected to internal NODE X which is in turn connected through a resistor 32 to the base 26 of the transistor 22. The emitter 24 of transistor 22, which forms the emitter region of the overall current amplifier 11, is connected to external terminal 3. The base region 16 of transistor 12, which forms the base region of the overall current amplifier 11, is connected to NODE A and to external terminal 4.

The comparator amplifier 37 comprises a grounded emitter transistor 38 having emitter, base and collector regions 40, 42 and 44, respectively. The base region 42, which forms the input of the comparator, is connected to a voltage divider, formed by resistors 48 and 50, which is in turn connected between external terminals 5 and 6. The collector region 44 forms the output of the comparator and is connected to NODE A (i.e., to the base input of the current amplifier 11). The emitter region 40 is connected through a pair of oppositely poled, series connected diodes 52 and 54 to external terminal 6. The temperature compensation diode is poled on the same direction as the emitter base junction of transistor 38 and has a temperature coefficient of forward voltage opposite in sign to the temperature coefficient of reverse breakdown voltage of the diode 54. The voltage regulator diode 54 is of the avalanche breakdown type and establishes most of the standard reference voltage with which the comparator 37 compares the voltage at its base (which is proportional to the load voltage).

A field effect transistor (FET) constant current source 59 is connected between external terminal 1 and NODE A. The constant current source 59 comprises a field effect transistor 60 having drain, source and gate regions 62, 64 and 66. The drain region 62 is connected to external terminal 1, the gate region 66 is connected directly to NODE A and the source region 64 is connected through a bias resistor 68 to NODE A.

A clamp transistor 70, which controls the ON–OFF state of the multifunctional circuit 10, has its collector region 76 connected directly to NODE A (i.e., to the base input of the current amplifier 11). The emitter region 72 is directly connected to external terminal 6, and the base region 74 is connected through diode 77 to external terminal 7 and through bias resistor 78 to external terminal 6.

For the purposes of high frequency stability, a capacitor 56 is connected between NODE A and external terminal 6. In this configuration the capacitor 56 may be relatively large (e.g., 150 pf.) and consequently may be difficult to fabricate in integrated circuit form. FIG. 1B shows a capacitor 58 connected between the base region 42 and the collector region 44 of transistor 38 to provide high frequency stability in the same manner as the capacitor 56 in FIG. 1A. However, the configuration shown in FIG. 1B permits the use of the capacitor 58, which is smaller in size than the capacitor 56, by utilizing what is commonly known in the art as the Miller effect. In practice, the Miller effect means that the capacitor 58 is smaller than the capacitor 56 by a factor which is related to the voltage gain of transistor 38. The capacitor 58, typically 25 pf., is therefore more readily fabricated in integrated circuit (i.e., monolithic) form.

MULTIFUNCTIONAL CIRCUIT—INTEGRATED CIRCUIT FORM

Figure 2A:
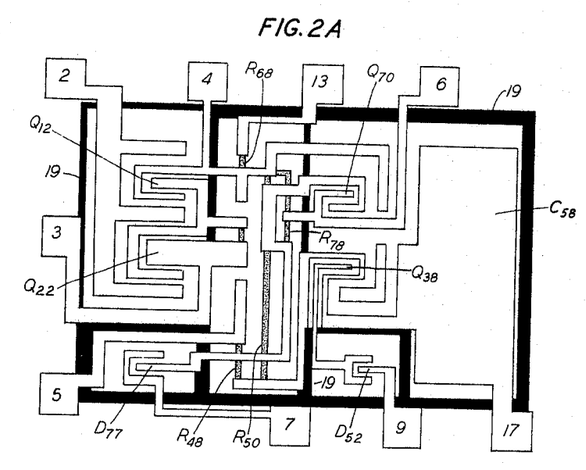
FIG. 2A shows an integrated circuit layout of the multifunctional circuit of FIG. 1A with the capacitor connected as in FIG. 1B.

The integrated circuit layout of the multifunctional circuit 10 is shown in FIG. 2A with the capacitor connected as in FIG. 1B. FIG. 2A is a plan view of the metallization pattern which is used to make electrical contact to the various circuit components. Numerals corresponding to those of FIGS. 1A and 1B have been used where appropriate.

When used as a low power voltage regulator (as described in the following section) the contact tabs are connected as follows: tab 2 to the positive terminal of the supply voltage; tab 3 to the load (output); tab 5 to the load; tab 7 to a switching signal source; tab 9 to the voltage regulator diode 54 formed on a separate chip; tabs 4 and 13 to the gate and source, respectively, of the FET which is also formed on a separate chip, and tab 6 to ground. Tab 17 is connected directly to the base of the comparator 38 in the event that it is desired to use an external voltage divider (in lieu of resistors 48 and 50) in order to regulate the output at different voltages.

It should be noted that the swamping resistor 32 of FIG. 1A is not shown in FIG. 2A because transistor 22 is made such that its internal base and emitter resistances are adequate to prevent circuit oscillations.

The shaded areas 19 represent the isolation pattern diffused into an epitaxial layer in order to provide electrical isolation for the transistors and diodes.

Figure 2B:
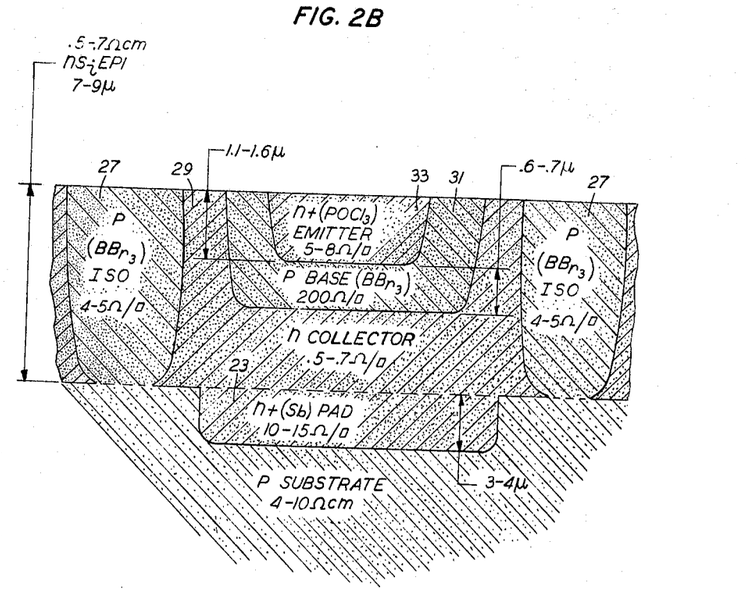
FIG. 2B shows a vertical cross section on an expanded scale of a typical transistor used in the multifunctional circuit.

A vertical cross-sectional view on an expanded scale of a typical transistor used is shown in FIG. 2B. The transistor comprises a p-type substrate into which is diffused an n+-type buried layer 23 which provides a high conductivity contact to the collector region to be formed. Next an n-type silicon epitaxial layer is formed over the entire substrate. This layer will ultimately form the collector region. An isolation diffusion step forms the regions 27 to electrically isolate the transistor. The base region 31 is then diffused into the collector region 29 and subsequently the emitter region 33 is diffused into the base region 31.

The fabrication of the transistor is accomplished by well-known photolithographic processes. The appropriate diffusants, resistivities and region thicknesses are indicated on FIG. 2B.

LOW POWER, POSITIVE VOLTAGE REGULATOR

Figure 3:
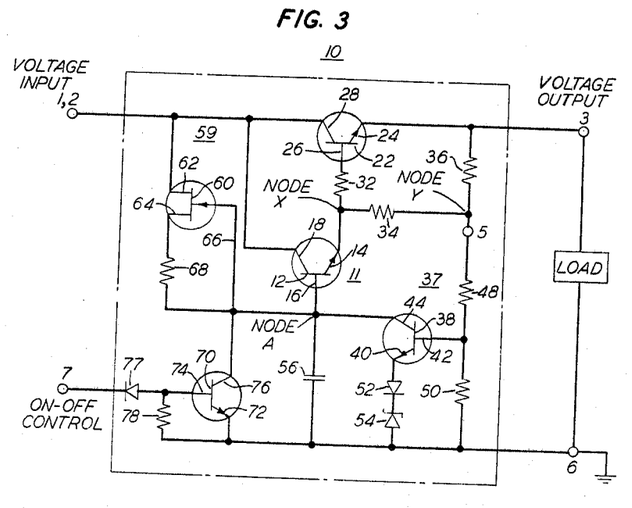
FIG. 3 is a schematic of a low power voltage regulator utilizing the multifunctional circuit of FIG. 1A.

The multifunctional circuit 10 shown in FIG. 1A is readily connected to perform the functions of a low power positive voltage regulator in the manner shown in FIG. 3. Terminals 1 and 2 are connected to the more positive side of an unregulated input voltage source, and terminal 3 is directly connected to one side of a load. Terminal 6 is grounded, and terminal 7 is connected to an ON-OFF control source. For the purposes of high frequency stability, an internal phase compensation network, comprising a pair of resistors connected in series, is connected between the emitter region 24 and internal NODE X. The junction point between the series connected resistors forms an external NODE Y which is connected to terminal 5.

The current amplifier 11 is effectively a variable impedance element connected between the unregulated input and the load. The impedance of the current amplifier 11 is controlled by the comparator amplifier 37 which samples the output voltage at the load through the voltage divider formed by resistors 48 and 50. The comparator amplifier 37 compares the portion of the output voltage which appears at its base region 42 with the reference voltage established by the base-emitter junction off-set voltage of transistor 38, the voltage regulator diode 54, and the temperature compensating diode 52 connected in its emitter circuit. The negative feedback arrangement causes the current amplifier 11 to be driven so as to reduce to zero any difference between the voltage at its base region 42 and the reference voltage.

The field effect transistor constant current source 59 connected between the unregulated input and the output of the comparator amplifier 37 operates as a preregulator. The FET effectively prevents supply current variations from being injected into the base region 16 of the current amplifier 11, and, in addition, serves as a high impedance load to the comparator amplifier 37. The FET also provides a constant current to the voltage regulator diode 54 and temperature compensating diode 52 thereby establishing a fixed bias current through the diodes and consequently providing a stable reference voltage.

Because the FET requires a relatively small source to gate bias voltage (e.g., 2 volts) it is a highly efficient preregulator. The ability to operate with such a small bias voltage has two principal effects; first, it means that the regulator is more efficient because less power is wasted in the preregulator; and, second, it means that the regulator is capable of regulating the output voltage to within a few volts of the input voltage. That is, for example, if 12 volts is to be maintained across the load, the regulator could regulate input voltages as low as approximately 15 volts without losing the necessary 2 volt bias on the preregulator. The three volt difference is dropped across the preregulator 59 (about 2 volts) and across the base-emitter junctions of the current amplifier 11 (about 1 volt).

Alternatively, the terminals 1 could be connected to a separate source of voltage, not shown, rather than to the input supply. This configuration would allow the output to be regulated to within less than one volt of the input because the bias voltage of the FET would no longer be dropped between the input (terminal 2) and the output (terminal 3).

A clamp transistor 70 operates to turn ON and OFF the voltage regulator in response to a control signal applied at external terminal 7. When the transistor 70 is turned ON, its collector voltage reduces the voltage of the base region 16 of the current amplifier 11 to substantially ground potential. With the base region 16 clamped to ground, the regulator is switched OFF and the load is effectively disconnected from the supply. When the supply constitutes a battery (e.g., the emergency supply battery of a telephone system), it is important that the internal current drain of the regulator in the OFF state be minimized in order not to run down the battery. The current drain is reduced to less than one milliampere because of the highly nonlinear impedance of the field effect transistor 60.

The D.C. stability of a voltage regulator is adversely affected by temperature induced changes in the semiconductor junctions of the transistors and diodes. Changes in breakdown voltage of the avalanche voltage regulator diode 54 are particularly detrimental because the diode 54 establishes most of the standard reference voltage. The voltage regulator diode 54 typically has a positive temperature coefficient of reverse breakdown voltage. In order to compensate for the changes in its breakdown voltage, the temperature compensation diode 52 is selected to have a negative temperature coefficient of forward voltage. The effect is to improve D.C. stability by reducing the net effect of temperature induced voltage changes.

As pointed out previously, in order to achieve D.C. stability, it is desirable that the amplifier involved have a relatively high gain. When a large amount of gain (e.g. 70 db) is provided, however, the regulator tends to oscillate which is indicative of poor A.C. stability. Oscillation is particularly troublesome where, from time to time, the current drawn by the load undergoes sharp transient variations. Such transients contain high frequency components which initiate either a transient or a sustained self-oscillation of the voltage regulator feedback circuit.

The A.C. stability of the present invention is improved in several ways, including the use of (1) resistor 32, (2) the capacitor 56 or the capacitor 58, and (3) the phase compensation network comprising the resistors 34 and 36. The resistor 32 serves to assure that the impedance at NODE X will be positive, and the capacitor 56 (or 58) creates a dominant cut in the gain-frequency characteristic in such a way that the overall loop gain reaches unity before the phase shift accumulates to 180°. The frequency at which the cut occurs is approximately the reciprocal of the RC time constant equal to the product of the resistance at NODE A and the capacitance of capacitor 56.

Figure 4A:
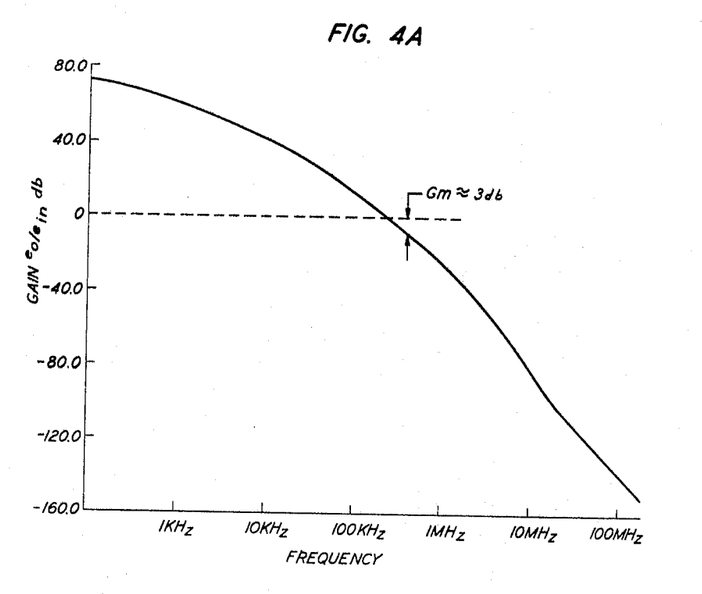
FIGS. 4A and 4B are graphs of gain and phase, respectively, versus frequency without the phase compensation network in the voltage regulator of FIG. 3.
Figure 4B:
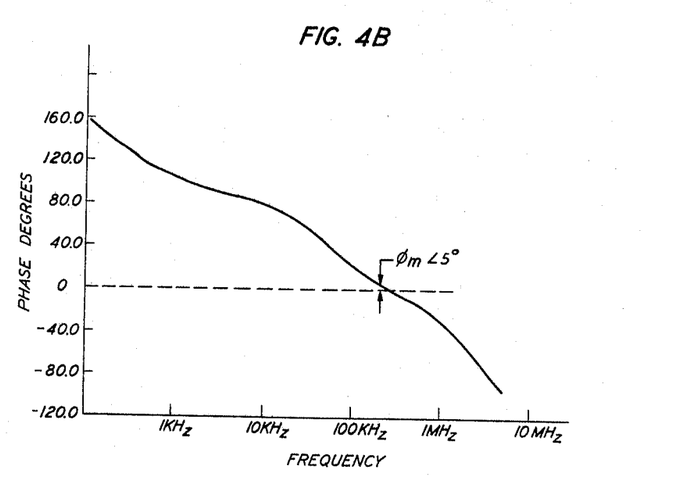
Figure 4C:
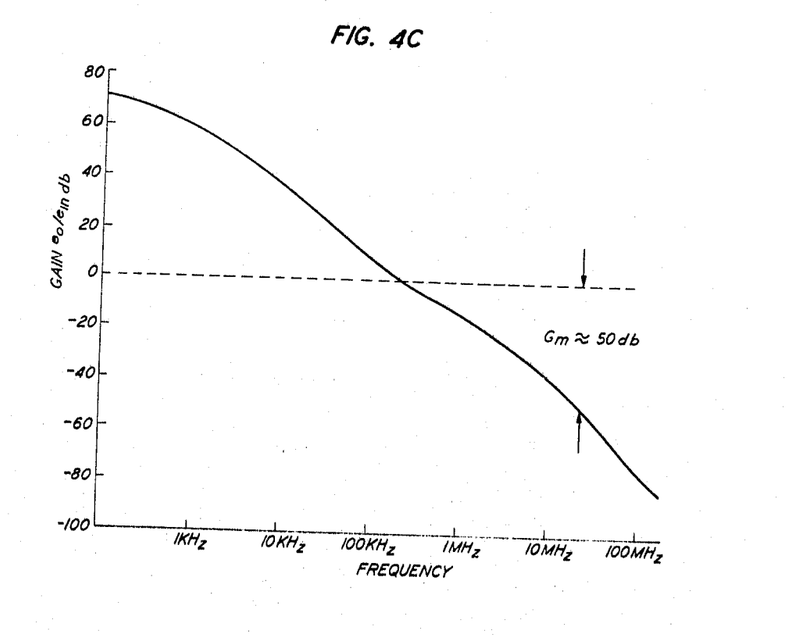
FIGS. 4C and 4D are graphs of gain and phase, respectively versus frequency with the phase compensation network in the voltage regulator of FIG. 3.
Figure 4D:
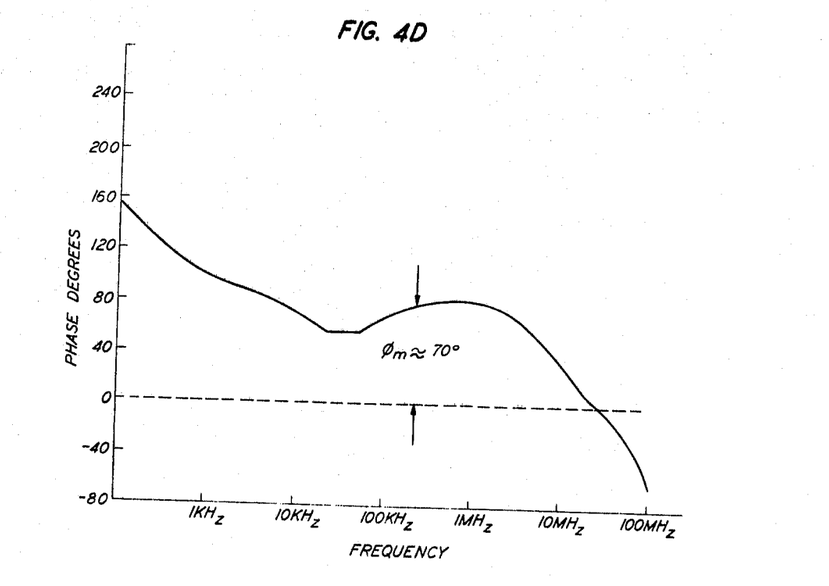

The phase compensation network improves A.C. stability when a large external capacitor is connected across the regulator output. The network in accordance with the present invention is basically a lead-lag circuit which prevents external load capacitance from injecting at high frequencies excessive phase lag in the feedback loop formed by comparator 37, amplifier 11 and resistors 36 and 48. The circuit operates to introduce phase lead sufficient to maintain the loop phase shift to significantly less than 180° up to and beyond the unity gain frequency. Resistor 34 forms an additional feedback loop comprising comparator 37, transistor 12 and resistors 34 and 48. The phase of this second loop is not similarly affected by the shunting effect of the load capacitance and prevents the injection of phase lag into the loop. The gain and phase versus frequency characteristics of the capacitor loaded voltage regulator without the phase compensation network are shown, respectively, in FIGS. 4A and 4B. FIG. 4A shows that the gain margin is only about 3 db at 300 kHz., and FIG. 4B shows that the phase margin is less than 5° at about 250 kHz. The addition of the phase compensation network has a marked effect in increasing both gain and phase margins as shown in FIGS. 4C and 4D. The effect is clearly shown in FIG. 4D. A "hump" is produced in the phase characteristic which prevents the phase from reaching zero degrees (i.e., 180°) before the gain reaches unity at 200 kHz. At this frequency the phase margin is approximately 70°. In fact, FIG. 4D shows that the phase does not reach zero degrees until a frequency of about 21 mHz., at which point the gain margin is approximately 50 db (see FIG. 4C). (The actual gain and phase margins apply to the circuit of FIG. 3 with the component values given in the following table and a load capacitance of 2.0 microfarads.)

| | |
|---|---|
| R32 ohms | 1000 |
| R34 do | 900 |
| R36 do | 100 |
| R48 do | 2100 |
| R50 do | 7900 |
| R68 do | 750 |
| R78 do | 2400 |
| D52 Forward voltage at 1 ma. volts | 0.7 |
| D54 Breakdown voltage do | 8.2 |
| C56 pf | 150 |
| C58 pf | 27 |
| T12 ($f_T$=500 mHz., $h_{fe}$=70) | |
| T22 ($f_T$=400 mHz., $h_{fe}$=70) | |
| T38 ($f_T$=500 mHz., $h_{fe}$=70) | |
| T70 ($f_T$=500 mHz., $h_{fe}$=70) | |
| FET 60 $I_{DSS}$ ma | 0.93 |
| Input voltage volts | 15–20 |
| Output voltage do | 12 |
| Output current ma | 30 |
| Drain current ma | 0.75 |
| Regulation percent | 0.35 |

HIGH POWER VOLTAGE REGULATOR—DRIVER FOR EXTERNAL NPN POWER TRANSISTOR

Figure 5:
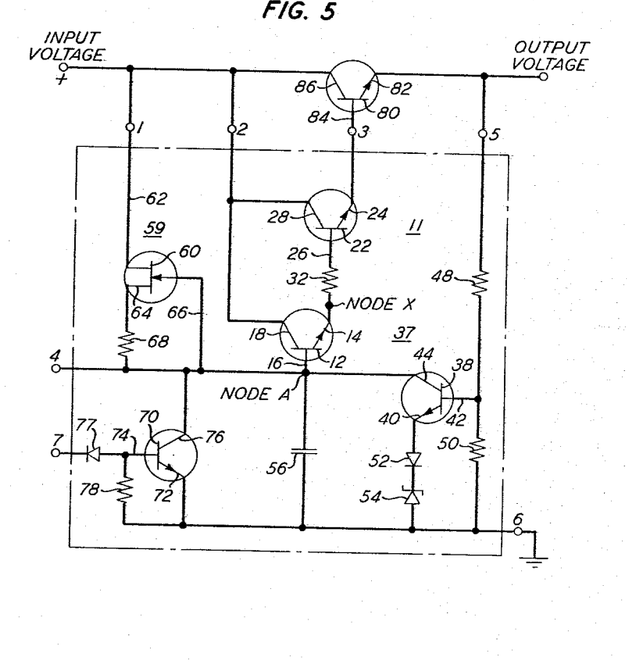
FIG. 5 is a schematic of high power voltage regulator utilizing the circuit of FIG. 1A as a driver for an external NPN control transistor.

The voltage regulator described with respect to FIG. 3 is typically a low power device. A voltage regulator with substantially higher power capabilities is constructed by utilizing the multifunctional circuit 10 as a driver for an external NPN power transistor as shown in FIG. 5. The higher power regulator is formed by connecting the output (terminal 3) of the current amplifier 11 to the base region 84 of the NPN power transistor 80. The collector region 86 of the power transistor 80 is connected to terminals 1 and 2 which are in turn connected to the positive terminal of the input voltage supply. The emitter region 82 is connected to terminal 5 and to the load.

The operation of the device is substantially as described with respect to the voltage regulator of FIG. 3 except that herein the phase compensation network has been eliminated. The addition of the power transistor 82 provides an additional stage of current amplification which allows the overall voltage regulator to handle currents in the ampere range, whereas the device of FIG. 3 is limited to the milliampere range. An additional capacitor may be connected between terminals 4 and 6 to increase the shunting capacity at NODE A, thereby maintaining adequate A.C. stability margins for the feed-back loop which has increased gain because of added transistor 80.

As pointed out previously, to allow the regulator to regulate the output to within a few volts of the input, terminals 1 and 2 can be connected to a separate voltage source, not shown.

HIGH POWER VOLTAGE REGULATOR—DRIVER FOR EXTERNAL PNP POWER TRANSISTOR

Figure 6:
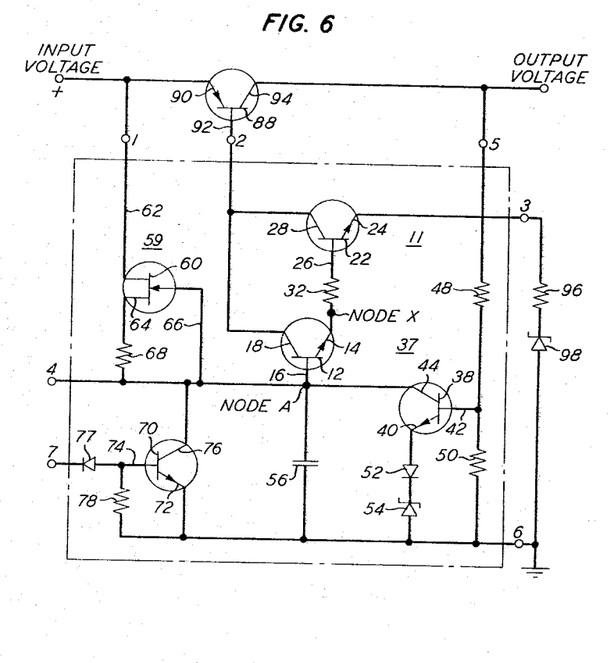
FIG. 6 is a schematic of a high power voltage regulator utilizing the circuit of FIG. 1A as a driver for an external PNP control transistor.

To achieve higher power capability as described in the previous section, the multifunctional circuit 10 may also be used as a driver for an external PNP power transistor as shown in FIG. 6. As with the external NPN transistor, the external PNP transistor allows the regulator to handle currents in the ampere range. Although the structure of the driver is identical to that previously described, the external interconnections are modified in order to compensate for current flow and biasing problems.

In particular, an external PNP power transistor 88 has its emitter region 90 connected to terminal 1 and to the positive side of the input supply voltage. Its collector region 94 is connected to terminal 5 and to the load. The base region 92 is connected to the collector region of the current amplifier 11 (i.e., terminal 2). The emitter region 24 of the current amplifier 11 (i.e., terminal 3) is returned to terminal 6 through a series combination of resistor 96 and voltage regulator diode 98. Terminal 6 is in turn grounded.

A comparison of FIG. 5 and FIG. 6 shows that in FIG. 6 it is necessary to drive the external PNP with the collector, and not the emitter, of the current amplifier 11. This connection is necessary because the transistors 12 and 22 of the current amplifier 11 are of the NPN type, whereas the external power transistor 88 is of the PNP type. Consequently, the current flow through these devices is naturally opposed to one another.

With the collector region of the Darlington amplifier 11 connected to the base region 92 of the power transistor 88, it is necessary to provide an appropriate connection for the emitter region 24. In the present invention, the emitter region 24 is returned to ground through the series combination of resistor 96 and voltage regulator diode 98 which is oppositely poled to the emitter-base junction of the transistor 22 of current amplifier 11. To a first approximation, the voltage regulator diode 98 is selected to have a breakdown voltage greater than the sum of the breakdown voltage of reference voltage regulator diode 54 plus the forward voltage of temperature compensating diode 52 plus the collector-emitter saturation voltage of transistor 38. The voltage regulator diode 98 is so selected in order to preserve the bias on transistor 38. If the emitter region 24 of the current amplifier 11 were returned directly to ground, the bias on the transistor 38 of the comparator amplifier 37 would be lost. The emitter region 24, furthermore, is not connected directly to the load because such a connection would tend to increase the minimum input voltage necessary to maintain the voltage between collector 18 and emitter 14 of transistor 12 at a minimum bias level of about one half volt.

The resistor 96 limits excessive current through diode 98 and transistor 22 which might occur if the load were short circuited.

In contrast to the NPN regulator of FIG. 5, the regulator of FIG. 6 can regulate the output to within a fraction of a volt of the input, the reason being that in the PNP regulator of FIG. 6 the input voltage at terminal 1 is dropped across the FET 60, and the base-emitter junctions of the current amplifier 11 to terminal 3, not to the output terminal 1 as is the case in the circuit of FIG. 5. Thus, although the voltage between terminals 3 and 6 of FIG. 6 must be 2 or 3 volts lower than the input due to the aforementioned voltage drops, the output need be only a fraction of a volt lower than the input.

As described in the previous section, an additional capacitor may be connected betwen terminals 4 and 6 for A.C. stability purposes.

NEGATIVE VOLTAGE REGULATOR

Figure 7:
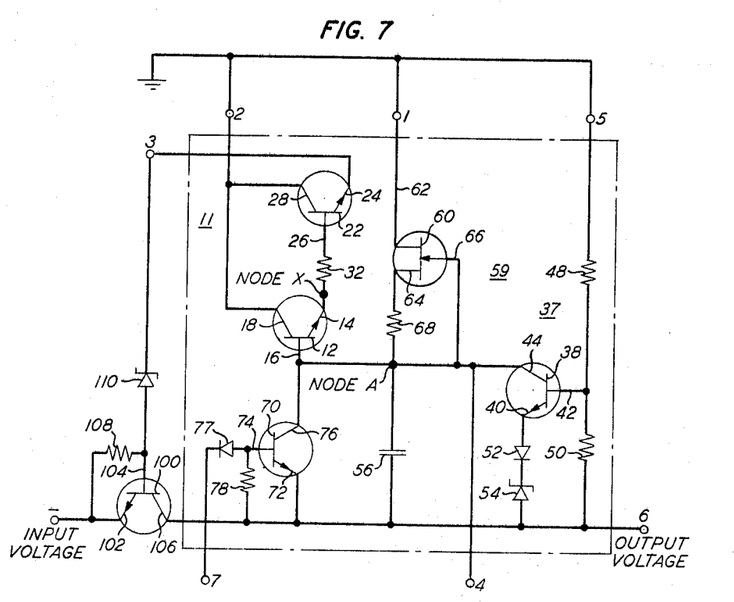
FIG. 7 is a schematic of a negative voltage regulator utilizing the multifunction circuit of FIG. 1A.

The multifunctional circuit 10 is readily connected to regulate a negative voltage supply as shown in FIG. 7. Terminals 1, 2 and 5 are grounded, terminal 6 is connected to the load, and terminal 3 is coupled through a level shift voltage regulator diode 110 to the base region 104 of an NPN series-regulating power transistor 100. The emitter region 102 of the transistor 100 is connected to the negative terminal of the input voltage supply and the collector region 106 is connected directly to the load. A bias resistor 108 is connected between the emitter and base regions 102 and 104, respectively. The voltage regulator diode 110 is used to level shift the voltage of base 104 sufficiently to maintain positive bias voltage across the collector-base junction of transistor 38. Without the voltage regulator diode to shift the voltage levels, insufficient voltage would drop across the emitter-base junctions of transistors 100, 22 and 12 (i.e., between the input and NODE A) to prevent a negative voltage from appearing between the collector region 44 and the base region 42 of NPN transistor 38. Thus the voltage regulator diode 110 shifts the voltage level between the input and NODE A to maintain the reverse bias on the collector-base junction of transistor 38.

The operation of the negative voltage regulator is substantially identical to that described with respect to the voltage regulators shown in FIGS. 3 or 5, and, again, for the purposes of A.C. stability an additional capacitor may be connected between terminals 4 and 6.

SWITCHING MODE VOLTAGE REGULATOR

Figure 8:
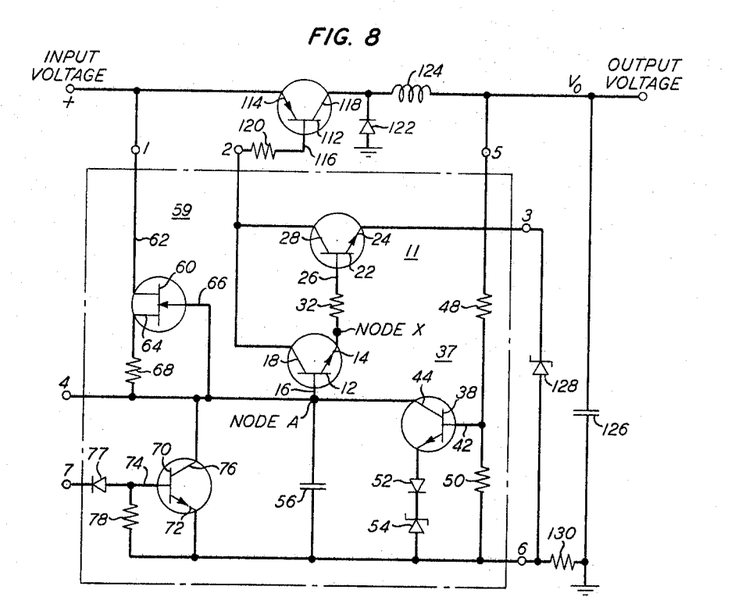
FIG. 8 is a schematic of a switching mode voltage regulator utilizing the multifunctional circuit of FIG. 1A.

The voltage regulators described are relatively inefficient in that the series-regulating transistor is drawing current and therefore consuming power as long as the regulator is in its ON state. It is possible, however, to switch on and off periodically the external series regulating transistor in order to decrease its duty cycle and therefore reduce the amount of power consumed by it. One technique for controlling the state of the series-regulating power transistor is to drive it with a standard multivibrator triggered by a level sensing circuit. The multifunctional circuit 10, however, performs this function by the use of a positive feedback circuit connected between ground and the input of the comparator amplifier 37, as shown in FIG. 8.

The switching mode regulator is formed by connecting terminal 1 of multifunctional circuit 10 directly to the input voltage supply and terminal 5 directly to the load. Terminal 3 (i.e., the emitter region 24 of the current amplifier 11) is connected through voltage regulator diode 128 to terminal 6 to preserve the bias on transistor 38, as previously described with respect to FIG. 6. Terminal 2 is connected through a resistor 120 to the base region 116 of external PNP power transistor 112. The emitter region 114 of the power transistor 112 is connected to the positive terminal of the input voltage supply and its collector region 118 is connected through a filter circuit to the load. The filter circuit comprises a diode 122 having its cathode connected to the collector region 118 and its anode connected to ground, an inductor 124 connected between the collector region 118 and the load, and a capacitor 126 connected between the load and ground.

Positive feedback is provided by means of a resistor 130 connected between terminal 6 and ground.

In order to avoid excessive power loss it is preferable that the external PNP series regulator 112 switch on and off sharply, that is, with short rise and fall times.

The series regulator 112 is switched between a saturated state and a cut off state by the multifunctional circuit 10 which operates as a trigger amplifier. The general operation is a follows. If the regulator 112 is saturated, then the trigger amplifier turns it OFF when the output voltage is greater than some predetermined voltage to be regulated, i.e., when $V_0 > S$. If regulator 112 is cut off, the trigger amplifier switches it back to saturation when $V_0 < S - \delta$, where $\delta$ is the trigger amplifier hysteresis voltage.

Because the regulator 112 is switched from saturation to cut off, its output voltage waveform is a square wave. The filter circuit smooths out this waveform, and, by the alternate charging and discharging of capacitor 126, results in the oscillation of the output voltage $V_0$ about the predetermined level S.

The aforementioned hysteresis voltage is produced in the present invention by means of the voltage drop across positive feedback resistor 130. The resistor 130 (typically 10 ohms) has in effect two voltage states. When the comparator 37 is ON, approximately 0.5 ma. from FET 59 flows through the transistor 38 and the resistor 130 to ground. The resultant voltage drop is only about 5 mv. which, for the purposes of this discussion, will be assumed to be zero. When the comparator 37 is OFF, the 0.5 ma. from the FET is amplified by the current amplifier 11 resulting in approximately a 20 ma. current which is fed back from the emitter region 24, through diode 128 and resistor 130 to ground. This current produces a 200 mv. (0.2 v.) drop in resistor 130. This voltage is the hysteresis voltage, and a portion of it determined by resistors 48 and 50, is fed back (positive feedback) to the input to comparator 37. It is to be noted here that the basic regulator still operates utilizing negative feedback, as previously described.

The manner in which the hysteresis voltage causes the trigger amplifier (and hence the series regulator 112) to turn on and off sharply is as follows. Consider the state of the regulator when the comparator 37 is On. Then both the current amplifier 11 and the series regulator 112 are OFF. Suppose $V_0$ is high and decreasing toward S. When the voltage at the base region 42 of comparator 37 approaches its threshold, the transistor 38 begins to turn OFF, the current amplifier 11 and the series regulator 112 begin to turn ON. The output current of amplifier 11 increases abruptly producing an abrupt increase in the voltage (i.e., the hysteresis voltage $\delta$) across resistor 130. The voltage at the base region 42 which was gradually approaching its threshold abruptly decreases below the threshold causing the comparator 37 to "snap" OFF thereby causing the current amplifier 11 and the series regulator 112 to "snap" ON.

Even though the hysteresis voltage is only a tenth of a volt compared to a regulated voltage of twelve volts, for example, it is sufficient to produce short rise and fall times with consequent reduction in power loss.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:
1. For use in a voltage regulator, a circuit comprising
   (a) a current amplifier having emitter, base and collector regions and an internal node,
   (b) a comparator amplifier for comparing the voltage across a load with a reference voltage, the output of said comparator amplifier being coupled to the base region of said current amplifier, so that any difference between the load voltage and the reference voltage causes said current amplifier to tend to reduce the difference to zero,
   (c) a field effect transistor constant current source connected between the more positive terminal of an unregulated input and the output of said comparator amplifier for preregulating the unregulated input and for providing a high impedance load to said comparator amplifier,
   (d) a clamp transistor, the output of said clamp transistor being connected to the base region of said current amplifier, said clamp transistor being responsive to a signal applied at its input to turn off said current amplifier by reducing the voltage of its base region,
   (e) first oscillation prevention means connected to said internal node of said current amplifier, and
   (f) second oscillation prevention means connected to the output of said comparator amplifier.

2. The circuit of claim 1 wherein said comparator amplifier comprises a transistor having emitter, base and collector regions, said base region being responsive to load voltage, said collector region forming the comparator amplifier output and being coupled to said base region of said current amplifier, and said emitter region being connected through series connected and oppositely poled diodes to ground, said diodes comprising
   (a) a voltage regulator diode to establish a reference voltage and having a temperature coefficient of reverse breakdown voltage, and
   (b) a second diode having a temperature coefficient of forward voltage opposite in sign to the temperature coefficient of said voltage regulator diode.

3. The circuit of claim 1 wherein said second oscillation prevention means comprises a capacitor connected between the output of said comparator amplifier and ground.

4. The circuit of claim 1 wherein said second oscillation prevention means comprises a capacitor connected between the output and the input of said comparator amplifier.

5. The circuit of claim 1 wherein said current amplifier comprises first and second transistor amplifiers each having emitter, base and collector regions, said emitter region of said first transistor being connected to said internal node, and wherein said first oscillation prevention means comprises a resistor connected between said internal node and said base region of said second amplifier.

6. The circuit of claim 1 wherein
   (a) said current amplifier comprises
      (1) first and second transistor amplifiers each having emitter, base and collector regions,
      (2) said collector regions of said first and second amplifiers being connected to form the collector region of said current amplifier,
      (3) said base region of said first amplifier forming the base region of said current amplifier,
      (4) said emitter region of said second amplifier forming the emitter region of said current amplifier,
      (5) said emitter region of said first amplifier connected to said internal node, and wherein
   (b) said first oscillation prevention means comprises a resistor interconnecting said internal node to said base region of said second amplifier,
   (c) said second oscillation prevention means comprises a capacitor connected between the output and the input of said comparator amplifier, and in combination with
   (d) phase compensation means connected between said emitter region and said internal node of said current amplifier, said means comprising
      (1) first and second resistors and an external node,
      (2) said first resistor being connected between said emitter region of said current amplifier and said external node,
      (3) said second resistor being connected between said internal node and said external node, and
      (4) said external node being coupled to the input of said comparator amplifier.

7. The circuit of claim 1 in combination with
   (a) an NPN series-regulating transistor having emitter, base and collector regions, said collector region being connected to the unregulated input, said base region being connected to the emitter region of said current amplifier, said emitter region being connected to a load, and
   (b) oscillation prevention means connected between the base region of said current amplifier and ground.

8. The circuit of claim 7 wherein said means comprises a capacitor.

9. The circuit of claim 1 in combination with
   (a) a PNP series-regulating transistor having emitter, base and collector regions, said emitter region being connected to the unregulated input, said collector region being connected to a load, said base region being connected to the collector of said current amplifier, and
   (b) means connected between the emitter region of said current amplifier and ground to maintain proper bias on said comparator amplifier.

10. The circuit of claim 9 wherein said means comprises a voltage regulator diode having a cathode and an anode, said cathode being connected to the emitter region of said current amplifier and said anode region being connected to ground.

11. The circuit of claim 10 in combination with means for preventing excessive current flow through said diode comprising a ressitor connected between said cathode of said diode and said emitter region of said current amplifier.

12. The circuit of claim 1 for regulating a negative voltage wherein
    (a) said collector region of said current amplifier is connected to ground,
    (b) said field effect transistor constant current source is connected between ground and the output of said comparator amplifier,
    (c) an NPN series-regulating transistor having emitter, base and collector regions, said emitter region being connected to the unregulated negative input, said collector region being connected to a load, and
    (d) level shift means connected between the base region of said series-regulating transistor and the emitter region of said current amplifier.

13. The circuit of claim 12 wherein said level shift means comprises a voltage regulator diode having an anode and a cathode, said anode being connected to said base region of said NPN series-regulating transistor and said cathode being connected to said collector region of said current amplifier.

14. The circuit of claim 1 for regulation in a switching mode in combination with
    (a) a PNP series-regulating transistor having emitter, base and collector regions, said emitter region being connected to the unregulated input, said base region being coupled to the collector region of said current amplifier,
    (b) filter means connected between said collector region of said PNP series-regulating transsitor and the load.
    (c) positive feedback means for developing a voltage at the input of said comparator amplifier proportional to the output current flow from the emitter region of said current amplifier, and
    (d) means connected between the emitter region of said current amplifier and said positive feedback means for maintaining proper bias on said comparator amplifier.

15. The circuit of claim 14 wherein said filter means comprises
    (a) a diode having its cathode connected to the collector region of said series-regulating transistor and its anode connected to ground,
    (b) an inductor connected between the cathode of said diode and the load, and
    (c) a capacitor connected between the load and ground.

16. The circuit of claim 14 wherein said positive feedback means comprises a resistor having one terminal connected to ground and the other terminal coupled to the input of said comparator amplifier.

17. The circuit of claim 16 wherein said bias maintaining means comprises a voltage regulator diode having an anode and a cathode, said cathode being connected to the emitter region of said current amplifier and said anode being connected to said other terminal of said resistor.

References Cited

UNITED STATES PATENTS

| | | | |
|---|---|---|---|
| 3,069,617 | 12/1962 | Mohler | 323—22 |
| 3,163,814 | 12/1964 | Todd | 323—22 |
| 3,182,246 | 5/1965 | Lloyd | 323—22 |
| 3,237,082 | 2/1966 | Heller et al. | 323—22 X |

JOHN F. COUCH, Primary Examiner

G. GOLDBERG, Assistant Examiner

U.S. Cl. X.R.

307—253, 279, 297,304; 323—38